Jan. 10, 1928.
C. C. SHIPMAN
1,655,879
METHOD OF PREPARING ARTICLES SUCH AS VALVE STEM PADS FOR INNER TUBES
Filed April 26, 1926
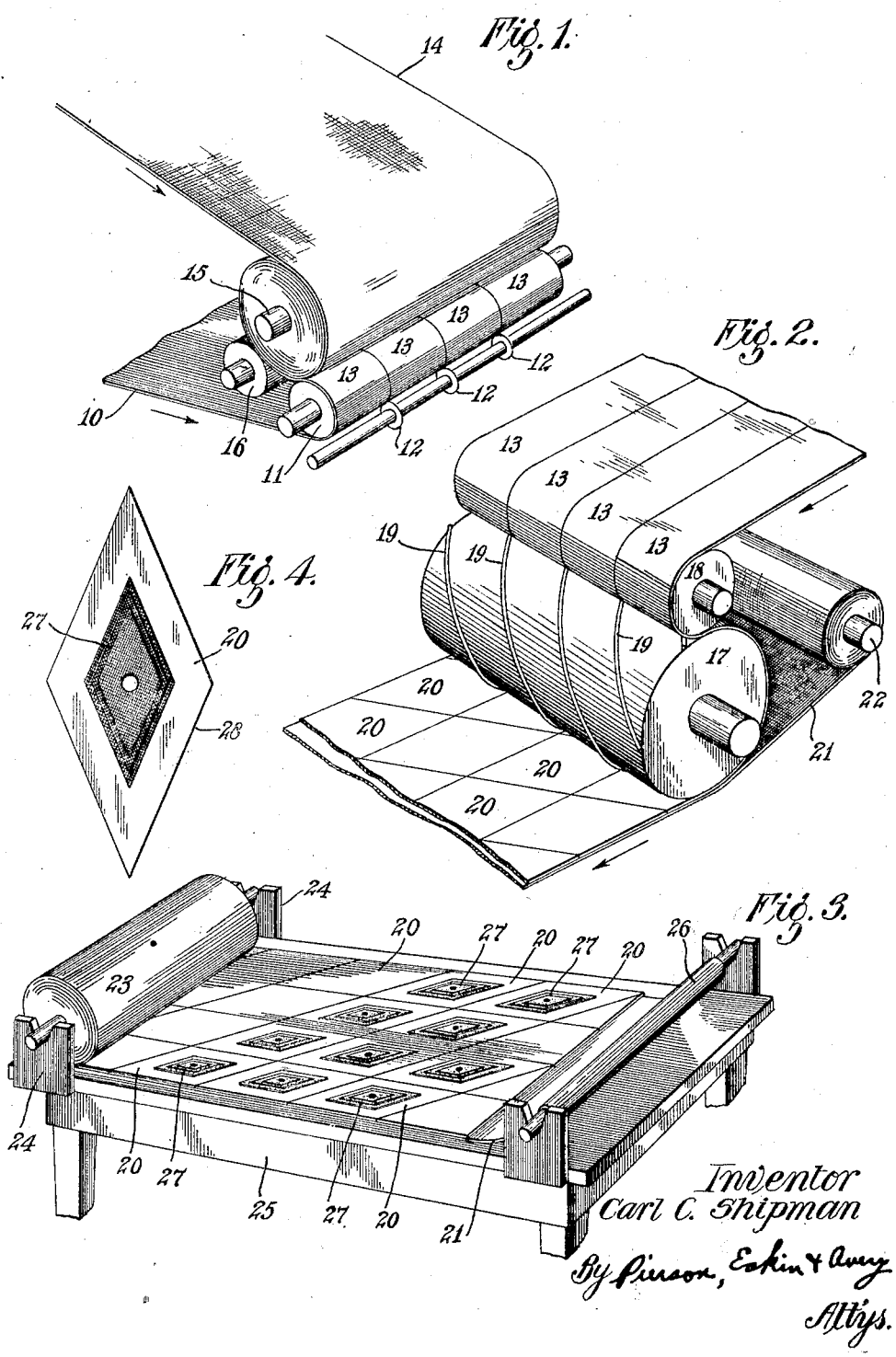

Patented Jan. 10, 1928.

1,655,879

UNITED STATES PATENT OFFICE.

CARL C. SHIPMAN, OF AKRON, OHIO, ASSIGNOR TO THE B. F. GOODRICH COMPANY, OF NEW YORK, N. Y., A CORPORATION OF NEW YORK.

METHOD OF PREPARING ARTICLES SUCH AS VALVE-STEM PADS FOR INNER TUBES.

Application filed April 26, 1926. Serial No. 104,600.

This invention relates to the art of preparing articles such as laminated valve-stem pads for inner tubes.

Such pads usually are composed of a base layer of sheeted rubber and diamond-shaped laminæ of rubberized fabric of successively smaller size superimposed upon the base layer and adhering thereto, and a common practice prior to my invention was to die out the rubber base sheet in oblate form, to build up the fabric laminæ as a separate unit, and thereafter apply the fabric units of successive pads to successive base sheets while the latter were carried on a conveyor belt, and thereafter to book the finished pads between liners for transportation or storage.

In this prior practice the base sheets, because of their oblate, curvilinear form, which was considered necessary for proper adhesion of the margin of the base sheet of the valve-stem pad to the inner tube blank, were cut with a substantial amount of waste and with a comparatively large amount of labor, and a great deal of labor was involved also in the application of the fabric units and the booking of the product.

My chief objects are to reduce the amount of waste and to effect an economy of labor in the manipulation of the stock to produce the valve-stem pads or the like and in the manipulation of the product.

I attain these objects, in my preferred procedure, by running a long sheet of rubber through a slitter to produce parallel strips of rubber, running the strips in side-by-side or edge-to-edge relation through a rotary bias-cutter to cut them into diamond-shaped blanks, and maintaining the blanks in the relative positions which they occupied in the original sheet while applying to them the fabric units, after which the resulting valve stem pads may be interwound with a liner while kept in such relation or may be otherwise manipulated for transporting them to the tube building station and incorporating them into the tubes.

Of the accompanying drawings:

Fig. 1 is a perspective view of parts of a slitter adapted to cut the rubber sheet into parallel strips in the practice of my invention in its preferred form, and of the work therein.

Fig. 2 is a perspective view of parts of a rotary bias-cutter adapted to cut the parallel strips into diamond-shaped blanks, and of the work therein.

Fig. 3 is a perspective view of an assembling table adapted for convenient mounting of the fabric units on the rubber foundation sheets or blanks.

Fig. 4 is a face view of the complete valve-stem pad ready for incorporation in a tube.

Referring to the drawings, the initial rubber stock sheet is shown in Fig. 1 at 10 in process of being drawn from a suitable source of supply (not shown) and run through a slitter comprising a platen-roll 11 and rotary cutters 12, 12 coacting therewith to slit the sheet 10 longitudinally into parallel strips 13, 13 each of a width suitable for reaches of its side edges to constitute two parallel edges of a diamond-shaped blank of the desired size.

The strips 13 are shown in process of being interwound, in the edge-to-edge positions which they occupied in the original sheet 10, with a liner 14 drawn from a suitable source of supply (not shown), onto a roll-core or wind-up roll 15, which readily may be done by providing a roll 16 adapted with the platen-roll 11 to constitute a pair of cradle rolls and mounting the wind-up roll thereon as shown so that it will be peripherally driven thereby.

In Fig. 2 17 is the cutter-roll and 18 the platen-roll of a rotary bias-cutter, the cutter-roll being provided with helically disposed knives 19, 19 thereon adapted concurrently to cut each of the rubber strips 13 into a string of diamond-shaped valve-pad bases 20, 20 as the strips 13 are fed over the platen-roll 18 and between it and the cutter-roll 17, the strips 13 being freed from the liner 14 of Fig. 1 and drawn to the rotary cutter in side-by-side relation, which readily may be done by suitably mounting the roll-core 15 of Fig. 1, with the stock and liner-winder thereon, adjacent the rotary cutter and providing well-known liner rewinding means (not shown).

As the blanks 20 pass about the cutter-roll 17 in their original relative positions to the lower part of its orbit a liner 21 drawn from a suitably mounted liner supply-roll 22 is passed under the cutter-roll 17 so as to receive the blanks therefrom and carry them away as a field of blanks still occupying the said relative positions and the liner and field of blanks thereon is wound into a roll such as the roll 23 of Fig. 3.

The roll 23 is then mounted in bearing brackets 24, 24 rising from one end of the assembling table 25 of Fig. 3, the liner 21 and its field of blanks 20 are drawn out of the roll 23, over the table 25, and rewound upon a roll-core 26 mounted at the other end of the table, and as they pass over the table respective fabric units 27, 27 are applied to the blanks 20 by hand and caused to adhere thereto by pressure of the rewinding.

The resulting valve-stem pads are such as that shown at 28 in Fig. 4, and the valve-stem pads as a continuous field pass onto the roll-core 26 with the liner 21, providing a stock-roll which readily may be transported to the tube building station and from which they readily may be withdrawn in convenient relation for picking them off of the liner 21 and incorporating them into the tubes.

I do not wholly limit my claims, however, to rolling and unrolling the stock between operations thereon.

The procedure described eliminates wastage of stock, provides for the mounting of the fabric units upon the rubber blanks while the latter are supported in such definite and close relation to each other as to facilitate the accurate positioning of the fabric units, and provides for rapid cutting of the rubber blanks by progressively-acting rotary means. The close relation in which the rubber stock units are maintained avoids wastage of liner space, or other blank-supporting space, with consequent economy. Handling of the rubber blanks is avoided, so that its adhesiveness is not impaired.

My invention is subject to modification without sacrifice of all of its advantages, and I do not wholly limit my claims to the exact procedure described.

I claim:

1. The method of preparing laminated stock units for the manufacture of rubber articles which comprises cutting a sheet of stock along lines such as to produce without waste a field of blanks substantially coextensive with the sheet and superimposing a stock unit upon each blank while the blanks are maintained in substantially the same relative positions they occupied in the original sheet.

2. The method of preparing valve-stem patches which comprises cutting a sheet of rubber on numerous intersecting lines such as to divide the sheet into numerous blanks of like configuration and maintaining the said blanks substantially in the relative positions which they occupied in the original sheet while applying to each blank a fabric reinforcing unit.

3. A method as defined in claim 2 in which the cutting steps are effected progressively along the sheet.

4. The method of preparing valve-stem pads which comprises cutting a sheet of stock to produce a field of blanks in ranks and files and occupying substantially the same relative positions they occupied in the original sheet, maintaining them in such relation while applying respective units of stock thereto, and thereafter manipulating the resulting field of composite units substantially as a continuous sheet of material.

5. A method as defined in claim 4 in which the field of blanks is rolled in a liner.

In witness whereof I have hereunto set my hand this 22nd day of April, 1926.

CARL C. SHIPMAN.